(12) United States Patent
Song et al.

(10) Patent No.: US 7,782,425 B2
(45) Date of Patent: Aug. 24, 2010

(54) OCB MODE LIQUID CRYSTAL DISPLAY AND A DRIVING METHOD OF THE SAME

(75) Inventors: Jang-Kun Song, Seoul (KR); Chang-Hun Lee, Kyungki-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1121 days.

(21) Appl. No.: 10/524,511

(22) PCT Filed: Sep. 18, 2002

(86) PCT No.: PCT/KR02/01761

§ 371 (c)(1),
(2), (4) Date: Sep. 23, 2005

(87) PCT Pub. No.: WO2004/017132

PCT Pub. Date: Feb. 26, 2004

(65) Prior Publication Data

US 2006/0139274 A1    Jun. 29, 2006

(30) Foreign Application Priority Data

Aug. 14, 2002    (KR) ...................... 10-2002-0048056

(51) Int. Cl.
G02F 1/1335    (2006.01)
C09K 19/02    (2006.01)

(52) U.S. Cl. ...................... 349/107; 349/106; 349/181

(58) Field of Classification Search .................. 349/106, 349/107, 181
See application file for complete search history.

(56) References Cited

U.S. PATENT DOCUMENTS 5,774,197 A * 6/1998 Nakamura ................... 349/117
5,796,378 A * 8/1998 Yoshida et al. ................ 345/88
5,929,955 A * 7/1999 Hsieh et al. .................. 349/106
6,069,620 A    5/2000 Nakamura et al.

FOREIGN PATENT DOCUMENTS

| CN | 1160222 | 9/1997 |
|---|---|---|
| CN | 1270326 | 10/2000 |
| CN | 1316064 | 10/2001 |
| JP | 09-230332 | 9/1997 |
| JP | 2000-250043 | 9/2000 |

(Continued)

*Primary Examiner*—Michael H Caley
(74) *Attorney, Agent, or Firm*—F. Chau & Associates, LLC (57) ABSTRACT

A liquid crystal display includes a TFT array panel, a color filter panel, a liquid crystal layer in an OCB mode, a pair of compensation films provided on outer surfaces of the TFT array panel and the color filter panel, a pair of polarization films provided on outer surfaces of the compensation films, and so on. When the wavelength dispersion of the liquid crystal layer is larger than the wavelength dispersion of the first and the second compensation films, the cell gap on the red pixel area>the cell gap on the green pixel area>the cell gap on the blue pixel area. On the contrary, when the wavelength dispersion of the liquid crystal layer is smaller than the wavelength dispersion of the first and the second compensation films, the cell gap on the red pixel area<the cell gap on the green pixel area<the cell gap on the blue pixel area.

3 Claims, 9 Drawing Sheets

FOREIGN PATENT DOCUMENTS

| | | |
|---|---|---|
| JP | 2001-066596 | 3/2001 |
| KR | 10-2000-0062847 A | 10/2000 |
| KR | 10-2001-0021391 A | 3/2001 |
| KR | 1020020053576 A | 7/2002 |
| WO | WO 0250603 A1 * | 6/2002 |

* cited by examiner

Equator of Poincare Sphere

FIG. 6

Equator of Poincare Sphere

OCB MODE LIQUID CRYSTAL DISPLAY AND A DRIVING METHOD OF THE SAME

BACKGROUND OF THE INVENTION (a) Field of the Invention

The present invention relates to an OCB (Optical Compensated Bend) mode liquid crystal display.

(b) Description of the Related Art

A typical liquid crystal display (LCD) includes an upper panel provided with a common electrode and color filters, etc., a lower panel provided with a plurality of thin film transistors (Ms) and a plurality of pixel electrodes, etc., and a liquid crystal (LC) material interposed between the panels. The pixel electrodes and the common electrode are supplied with different voltages to generate electric field changing the orientations of LC molecules, thereby controlling light transmittance to display images.

An OCB mode LCD among the LCDs has advantages in wide viewing angle and fast response and, recently, it has been actively studied for application. However, an OCB mode LCD has a problem of low contrast ratio. It is because the OCB mode LCD gives relatively high luminance in a black state in comparison with other mode LCDs, and the high luminance in the black state is caused by the difficulty in complete compensation of the wavelength dispersion of LCD using compensation films.

SUMMARY OF THE INVENTION

A motivation of the present invention is to improve the contrast ratio of an OCB mode LCD.

Based on the motivation, the present invention differentiates a cell gap or a black voltage for red, green and blue colors.

In detail, a liquid crystal display is provided, which includes: a first insulating substrate; a plurality of gate lines formed on the first insulating substrate; a plurality of data lines insulated from the gate lines and intersecting the gate lines to define a plurality of pixel areas; a plurality of pixel electrodes provided on the pixel areas; a plurality of thin film transistors connected to the gate lines, the data lines and the pixel electrodes; a second insulating substrate facing the first insulating substrate; a common electrode formed on the second insulating substrate; a liquid crystal layer interposed between the first insulating substrate and the second insulating substrate and aligned in an OCB mode; first and second compensation films provided on outer surfaces of the first and the second insulating substrate; and first and second polarization films provided on outer surfaces of the first and the second compensation films, wherein $Rr \leq 17$ nm, $Rg \leq 15$ nm and $Rb \leq 12$ nm where Rr, Rg and Rb are retardations in a black state for red, green and blue lights, respectively.

Alternatively, a liquid crystal display is provided, which includes: a first insulating substrate; a plurality of gate lines formed on the first insulating substrate; a plurality of data lines insulated from the gate lines and intersecting the gate lines to define red, green and blue pixel areas; a plurality of pixel electrodes provided on the pixel areas; a plurality of thin film transistors connected to the gate lines, the data lines and the pixel electrodes; a second insulating substrate facing the first insulating substrate; a common electrode formed on the second insulating substrate; a liquid crystal layer interposed between the first insulating substrate and the second insulating substrate and aligned in an OCB mode; first and second compensation films provided on outer surfaces of the first and the second insulating substrate; and first and second polarization films provided on outer surfaces of the first and the second compensation films, wherein a cell gap of the liquid crystal layer has different values on the red, the green and the blue pixel areas.

When wavelength dispersion of the liquid crystal layer is larger than the wavelength dispersion of the first and the second compensation films, the cell gap has values on the red, the green and the blue pixel areas satisfying the value on the red pixel area>the value on the green pixel area>the value on the blue pixel area. When wavelength dispersion of the liquid crystal layer is smaller than the wavelength dispersion of the first and the second compensation films, the cell gap has values on the red, the green and the blue pixel areas satisfying: the value on the red pixel area<the value on the green pixel area<the value on the blue pixel area.

The liquid crystal display may further include red, green and blue color filters disposed between the second insulating substrate and the common electrode, arranged corresponding to the red, the green and the blue pixel areas, respectively, and having different thicknesses. Alternatively, the liquid crystal display further includes: a gate insulating layer insulating the gate lines and the data lines; and a passivation layer insulating the data lines and the pixel electrodes and protecting the thin film transistors, wherein the green color filter is thicker than the red and the blue color filters and portions of the gate insulating layer and the passivation layer on the red and the green pixel areas are removed. Alternatively, the liquid crystal display may further include: red, green and blue color filters disposed between the second insulating substrate and the common electrode, arranged corresponding to the red, the green and the blue pixel areas, respectively; a gate insulating layer insulating the gate lines and the data lines; and a passivation layer insulating the data lines and the pixel electrodes and protecting the thin film transistors, wherein the green color filter is thicker than the red and the blue color filters and portions of the gate insulating layer and the passivation layer on the blue and the green pixel areas are removed. Alternatively, the liquid crystal display may further include: a gate insulating layer insulating the gate lines and the data lines; and a passivation layer insulating the data lines and the pixel electrodes and protecting the thin film transistors, wherein the passivation layer has a thickness different on the red, the green and the blue pixel areas.

According to another embodiment of the present invention, a liquid crystal display is provided, which includes: a first insulating substrate; a plurality of gate lines formed on the first insulating substrate; a plurality of data lines insulated from the gate lines and intersecting the gate lines to define red, green and blue pixel areas; a plurality of pixel electrodes provided on the pixel areas; a plurality of thin film transistors connected to the gate lines, the data lines and the pixel electrodes; a second insulating substrate facing the first insulating substrate; a common electrode formed on the second insulating substrate; a liquid crystal layer interposed between the first insulating substrate and the second insulating substrate and aligned in an OCB mode; first and second compensation films provided on outer surfaces of the first and the second insulating substrate; first and second polarization films provided on outer surfaces of the first and the second compensation films; a gate driver sequentially applying a gate-on voltage to the gate lines for turning on the thin film transistors; a data driver applying data voltages to the data lines; and a controller converting red, green and blue original image data from an external device into modified image data based on the difference in the wavelength dispersion between the compensation films and the liquid crystal layer, transmitting the modified image data to the data driver, and generating timing signals for controlling operation of the gate driver and the data driver to be output to the gate driver and the data driver.

When wavelength dispersion of the liquid crystal layer is larger than the wavelength dispersion of the first and the second compensation films, the controller performs the data conversion such that $V_{blue}>V_{green}>V_{red}$ for a gray. When wavelength dispersion of the liquid crystal layer is smaller than the wavelength dispersion of the first and the second compensation films, and the controller performs the data conversion such that $V_{blue}<V_{green}<V_{red}$ for a gray.

DETAILED DESCRIPTION OF PREFERRED EMBODIMENTS

The present invention now will be described more fully hereinafter with reference to the accompanying drawings, in which preferred embodiments of the invention are shown. The present invention may, however, be embodied in many different forms and should not be construed as limited to the embodiments set forth herein.

In the drawings, the thickness of layers, films and regions are exaggerated for clarity. Like numerals refer to like elements throughout. It will be understood that when an element such as a layer, film, region or substrate is referred to as being "on" another element, it can be directly on the other element or intervening elements may also be present In contrast, when an element is referred to as being "directly on" another element, there are no intervening elements present.

Now, liquid crystal displays according to embodiments of the present invention will be described with reference to the accompanying drawings.

Figure 1:
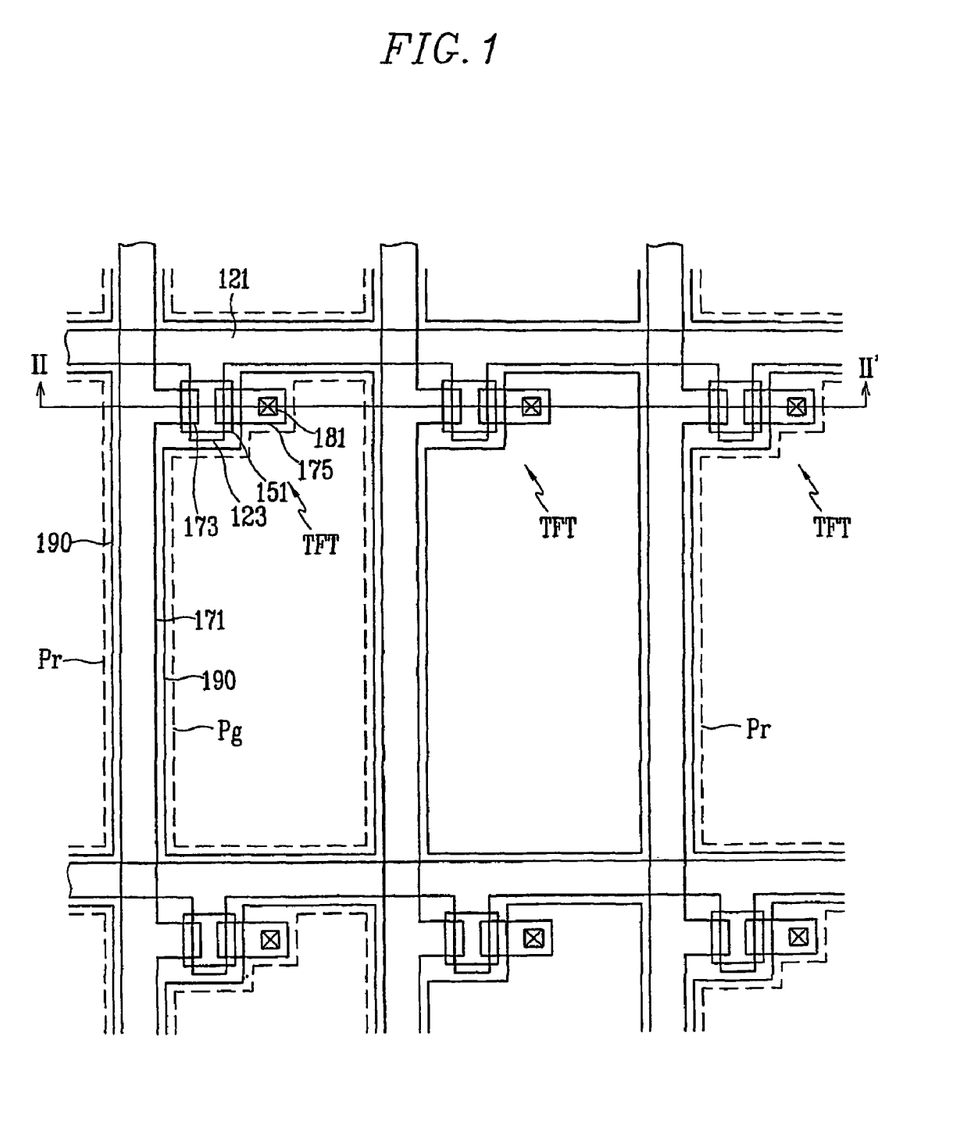
FIG. 1 is a layout view of LCDs according to first and second embodiments of the present invention.
Figure 2A:
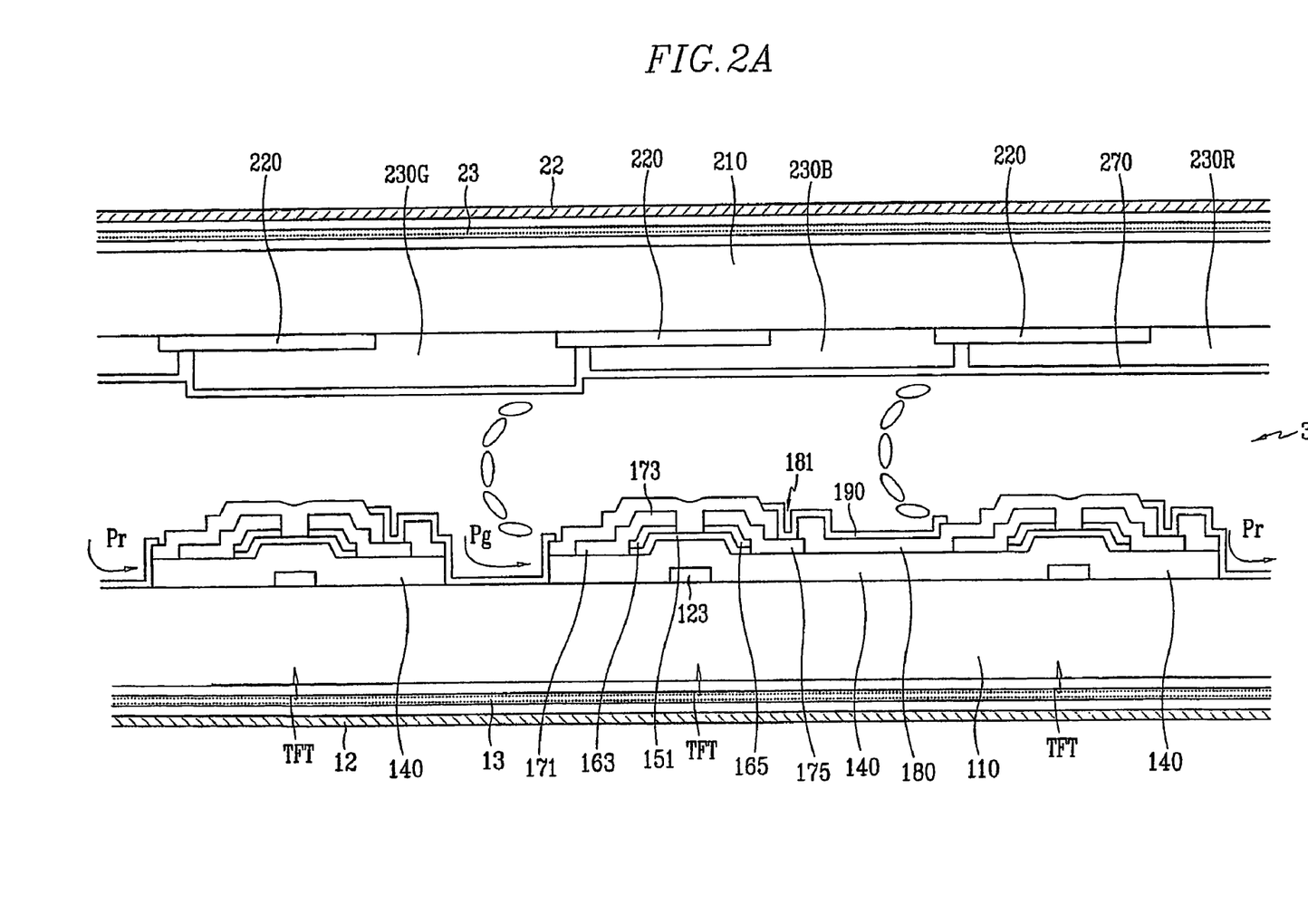
FIG. 2A is a sectional view of the LCD according to the first embodiment of the present invention taken along the line II-II' shown in FIG. 1.
Figure 2B:
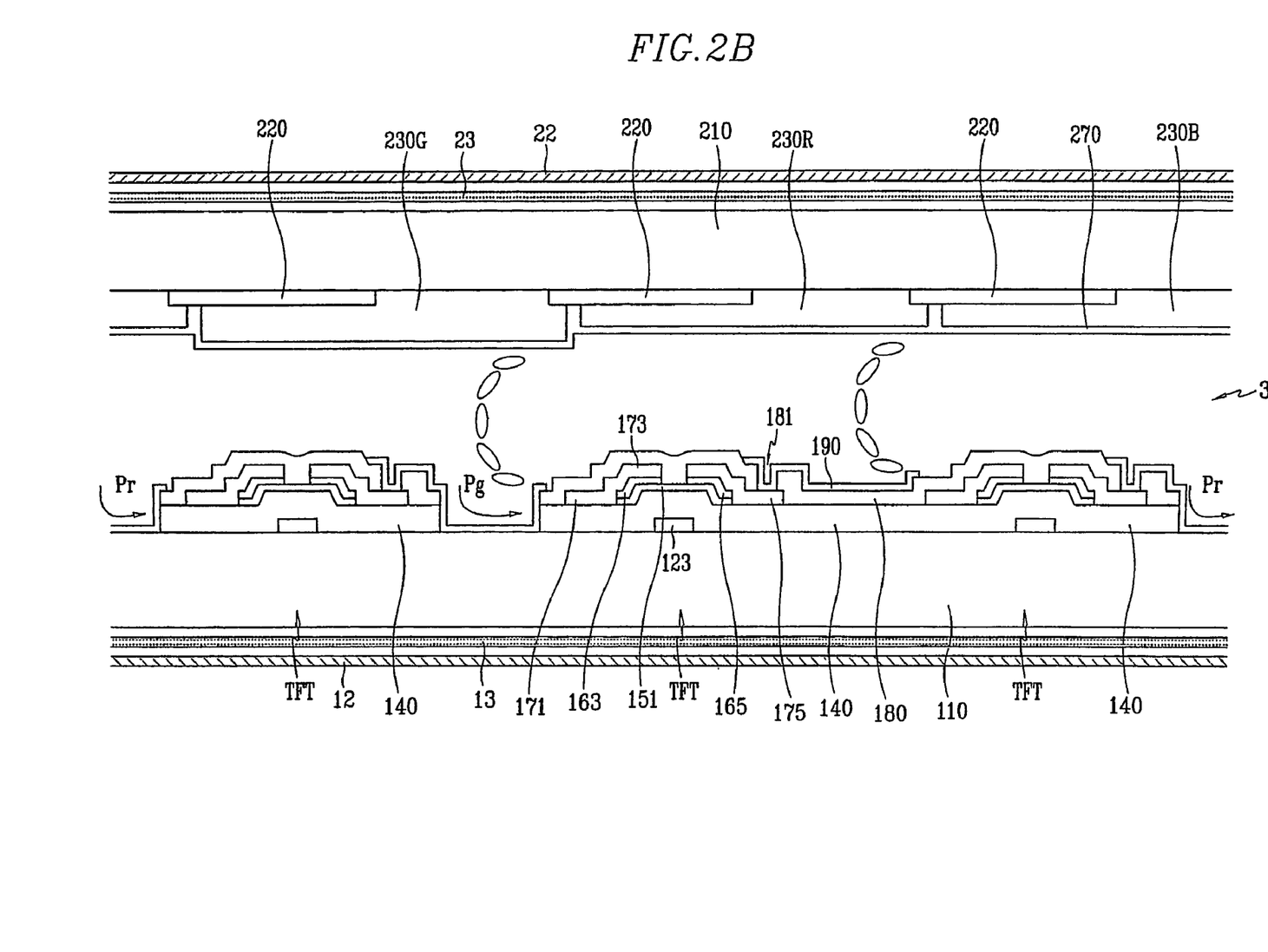
FIG. 2B a sectional view of the LCD according to the second embodiment of the present invention taken along the line II-II' shown in FIG. 1.

FIG. 1 is a layout view of LCDs according to first and second embodiments of the present invention, FIG. 2A is a sectional view of the LCD according to the first embodiment of the present invention taken along the line II-II' shown in FIG. 1, and FIG. 2B a sectional view of the LCD according to the second embodiment of the present invention taken along the line II-II' shown in FIG. 1.

First, an OCB mode LCD according to a first embodiment of the present invention is described with reference to FIGS. 1 and 2A.

An OCB mode LCD according to this embodiment includes a TFT array panel, a color filter panel, a LC layer 3 interposed between the panels, a pair of compensation films 13 and 23 attached to outer surfaces of the panels, and a pair of polarization films 12 and 22 attached to outer surfaces of the compensation films 13 and 23.

A TFT array panel is described now.

A gate wire 121 and 123 preferable made of conductive material such as Al, Al alloy, Cr, Cr alloy, Mo, Mo alloy, Cr nitride, and Mo nitride and having thickness of 1,000-3,500 Å is formed on an insulating substrate 110.

The gate wire 121 and 123 includes a plurality of gate lines 121 extending in a transverse direction and a plurality of gate electrodes 123 branched from the gate lines 121.

The gate wire 121 and 123 may have a multi-layered structure including at least two layers, and it is preferred that the multi-layered structure includes at least one layer made of metal having low resistivity.

A gate insulating layer 140 formed on the substrate 110, preferably made of silicon nitride or silicon oxide, and having thickness of 3,500-4,500 Å covers the gate wire 121 and 123.

A plurality of openings Pr and Pg exposing the substrate 110 are provided at the gate insulating layer 140. The openings Pr and Pg are located in some of a plurality of pixel areas defined by intersections of the gate lines 121 and a plurality of data lines 171, which will be described later. The pixel areas includes a plurality of red, green and blue pixel areas facing red, green and blue color filters R, G and B, respectively, and the openings Pr and Pg are located in the red pixel areas and the green pixel areas.

A semiconductor pattern 151 having thickness of 800-1,500 Å, is formed on the gate insulating layer 140. The semiconductor pattern 151 is preferably made of amorphous silicon and overlaps a plurality of gate electrodes 123. An ohmic contact layer 163 and 165 is formed on the semiconductor pattern 151. The ohmic contact layer 163 and 165 is preferably made of amorphous silicon doped with conductive impurity and has a thickness of 500-800 Å.

A data wire 171, 173 and 175 is formed on the ohmic contact layer 163 and 165 and the gate insulating layer 140. The data wire 171, 173 and 175 is preferably made of conductive material such as Al, Al alloy, Cr, Cr alloy, Mo, Mo alloy, C nitride, and Mo nitride and has a thickness of 1,500-3,500 Å.

The data wire 171, 173 and 175 includes a plurality of data lines 171 extending in a longitudinal direction and intersecting the gate lines 121 to define a plurality of pixel areas, a plurality of source electrodes 173 branched from the data lines 171 and extending onto one portions 163 of the ohmic contact layer, and a plurality of drain electrodes 175 facing the source electrodes 173, extending from the other portions 165 of the ohmic contact layer to portions of the gate insulating layer 140 in the pixel areas.

The data wire 171, 173 and 175 may have a multi-layered structure including at least two layers, and it is preferred that the multi-layered structure includes at least one layer made of metal having low resistivity.

The data wire 171, 173 and 175 and the semiconductor pattern 151 are covered with a passivation layer 180 made of insulating material such as silicon nitride and silicon oxide and having a thickness of 1,500-2,500 Å. The passivation layer 180 has a plurality of openings exposing the exposed portions of the substrate 110 exposed through the openings Pr and Pg of the gate insulating layer 140. (For descriptive convenience, the opening of the passivation layer 180 is indicated by the same reference characters Pr and Pg as the opening of the gate insulating layer 140.) The passivation layer 180 has a plurality of contact holes 181 exposing the drain electrodes 175, and a plurality of pixel electrodes 190 connected to the drain electrodes 175 through the contact holes 181 are formed on the passivation layer 180. The pixel electrodes 190 are made of transparent conductive material such as ITO and IZO.

The pixel electrodes 190 in the red pixel areas and the green pixel areas are located directly on the substrate 110, while those in the blue pixel areas are located on a lamination of the gate insulating layer 140 and the passivation layer 180. Accordingly, the pixel electrodes 190 in the red pixel areas and the green pixel areas have height different from those in the blue pixel areas by the thickness of the lamination of the passivation layer 180 and the gate insulating layer 140, i.e., 0.5 to 0.7 microns.

This configuration of the TFT array panel according to the first embodiment of the present invention gives the height difference of 0.5 to 0.7 microns between the blue pixel areas and the red and the green pixel areas.

The color filter panel facing the TFT array panel is described now.

A black matrix 220 facing portions of the gate lines 121, the data lines 171, and the TFTs of the TFT array panel is formed on a second insulating substrate 210.

A plurality of red color filters R, a plurality of green color filters G, and a plurality of blue color filters B are formed in sequence on parts of the second the substrate 210 and the black matrix 220. The green color filters G among the red, the green and the blue color filters R, G and B are thicker than other two color filters R and B by about 0.1 to 0.2 microns. In this way, the height difference equal to 0.1 to 0.2 microns is generated between the green color filters G and the red and the blue color filters R and B.

Entire Surface of the panel including the red, the green and the blue color filters R, G and B is covered with a common electrode 270 made of ITO or IZO.

When combining the color filter panel and the TFT array panel with a gap therebetween, the cell gap is different in the pixel areas.

In the assembly of the color filter panel and the TFT array panel, the blue pixel areas protrude toward a LC layer (not shown) interposed between the panels by about 0.5 to 0.7 microns from the red and the green pixel areas, and the green color filters G facing the green pixel areas protrude by about 0.1 to 0.2 microns from the red and the blue color filters R and G facing the red and the blue pixel areas.

Therefore, the cell gap satisfies the following relation:

cell gap in blue pixel area<cell gap in green pixel area<cell gap in red pixel area.

The LC layer is aligned in an OCB (optical compensated bend) mode, which aligns nematic LC in splay state, converts the alignment state into bend stat by applying a predetermined voltage, and adjusts applied voltages to control light transmittance.

The polarizing axes of the polarization films 12 and 22 are crossed, and the wavelength dispersion of the compensation films 13 and 23 is smaller than the wavelength dispersion of the LC layer 3. The compensation films 13 and 23 are established such that the compensation characteristics for green light are optimized.

As described above, the present invention makes the cell gap to have different values in the respective pixel areas such that the LCD has the cell gap having multi values. When the cell gap of the pixel areas is separately determined, light leakage due to the difference in the wavelength dispersion between the LC layer 3 and the compensation films 13 and 23 is prevented. Accordingly, the luminance in a black state is reduced to improve the contrast ratio.

In the meantime, the cell gap is adjusted by modifying the TFT array panel without differentiating the thickness of red, green and blue color filters R, G and B.

An OCB mode LCD according to a second embodiment of the present invention is described with reference to FIGS. 1 and 2B.

An OCB mode LCD according to a second embodiment has substantially the same configuration as that according to the first embodiment except that the relation of the cell gap between red, green and blue pixel areas is reversely defined and the wavelength dispersion of the compensation films 13 and 23 is larger than the wavelength dispersion of the LC layer 3. The cell gap according to the second embodiment satisfies the relation:

cell gap in blue pixel area>cell gap in green pixel area>cell gap in red pixel area.

The second embodiment has an advantage of improving the contrast ratio like the first embodiment.

The color variation of the cell gap in the first embodiment and the second embodiment is made for compensating the difference between the wavelength dispersion of the LC layer 3 and the wavelength dispersion of the compensation films 13 and 23 and the cell gap variation becomes larger as the difference in their wavelength dispersion becomes large.

The reason why the color variation of the cell gap improves the contrast ratio will be described in detail.

First, the reason why the luminance of the black gray in the OCB mode is higher than that in the other modes is described.

Figure 3:
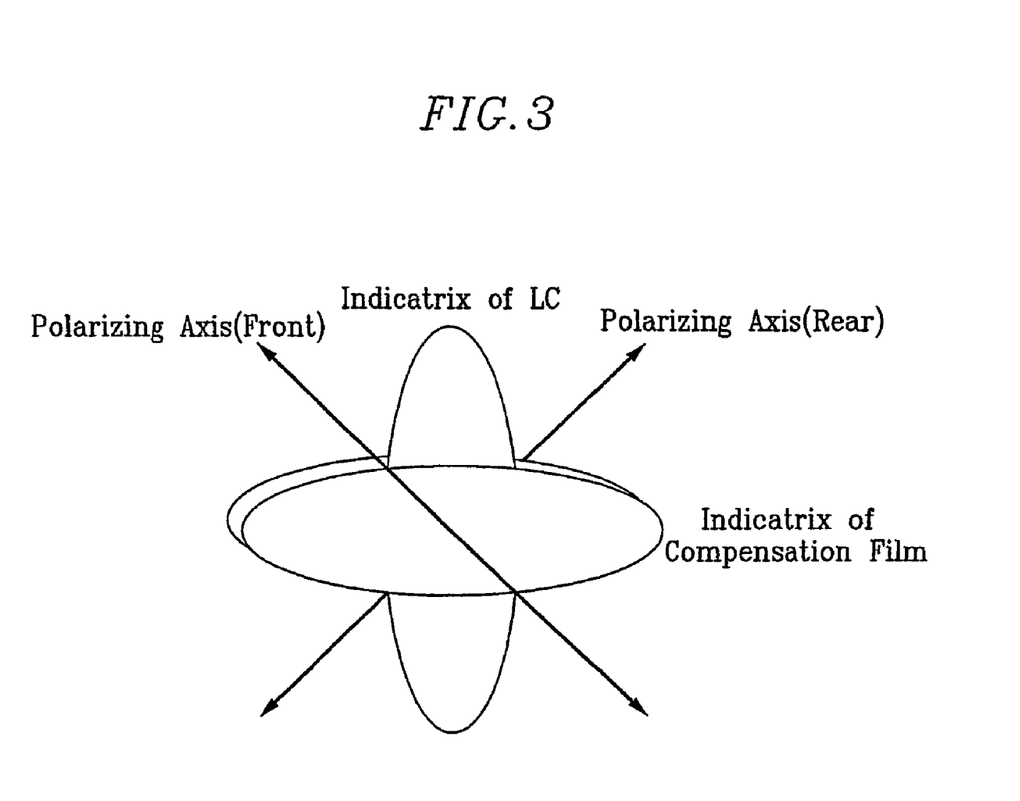
FIG. 3 illustrates the refractive anisotropy of a light transmitting medium when viewing from the front of an OCB mode LCD.
Figure 4:
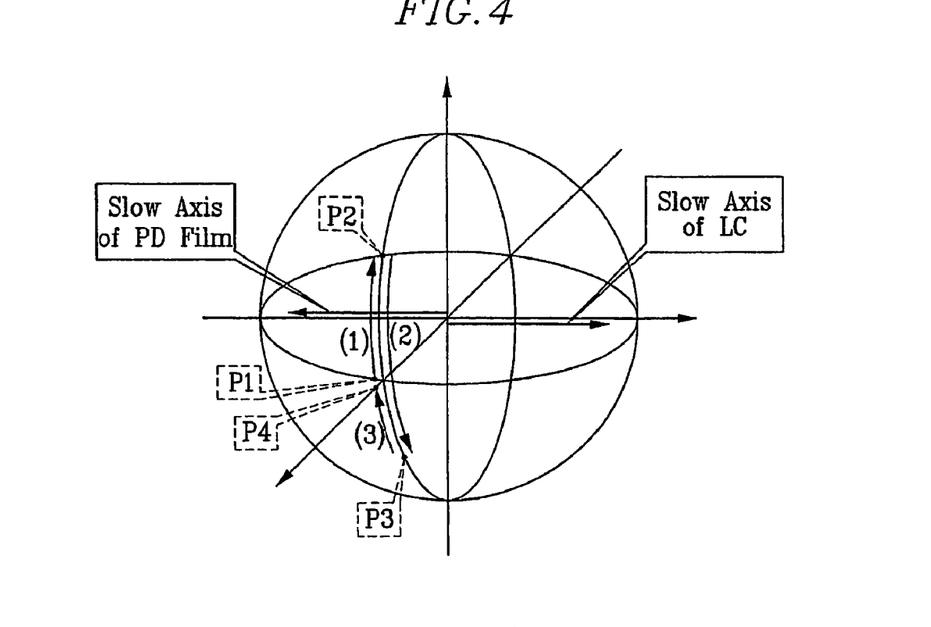
FIG. 4 is a Poincare Sphere illustrating the polarization experienced by light passing through an OCB mode LCD in the black state.

FIG. 3 illustrates the refractive anisotropy of a light transmitting medium when viewing from the front of an OCB mode LCD, and FIG. 4 is a Poincare Sphere illustrating the polarization experienced by light passing through an OCB mode LCD in the black state.

When a light passes through an LCD, as shown in FIG. 3, the polarization of the light after being linearly polarized by the polarizing film 12 is changed by the indicatrix of the compensation film 13, and then changed by the indicatrix of a LC layer 3. Subsequently, the light is linearly polarized by the polarizing film 22.

The change of the polarization is illustrated in a Poincare Sphere shown in FIG. 4.

The polarization of the light linearly polarized by the polarizing film 12 is located on the equator P1 of the Sphere, and the left-handed elliptical polarization of the light after passing through a phase difference film i.e., the compensation film 13 is located on a point P2 deviated from the equator and moved toward the North Pole. The light passing through the LC layer 3 has the right-handed elliptical polarization located on a point P3 deviated from the equator and moved toward the South Pole and, finally, the polarization of the light becomes linear again by a phase difference film, i.e., the compensation film 23 to be located on the equator P4.

The final linear polarization of the light after passing through the compensation films 13 and 23 and the LC layer 3 means the completion of compensation preventing light leakage. In the meantime, the refractive anisotropy of the LC layer 3 and the compensation films 13 and 23 depends on the wavelength of light, which is called the wavelength dispersion. The difference between the wavelength dispersion of the LC layer 3 and the wavelength dispersion of the compensation films 13 and 23 prevents perfect compensation for all colors.

Figure 5:
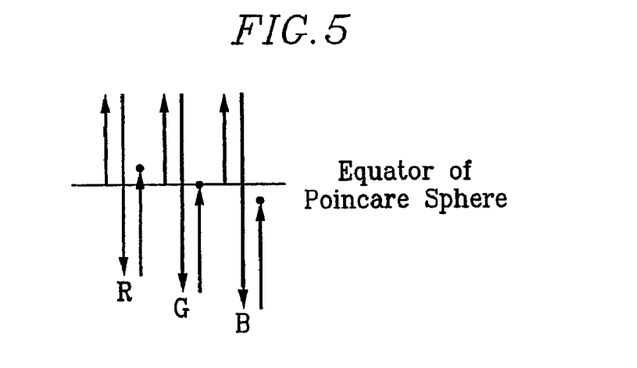
FIG. 5 illustrates polarizations of red, green and blue lights when the wavelength dispersion of a LC layer is larger than the wavelength dispersion of compensation films.
Figure 6:
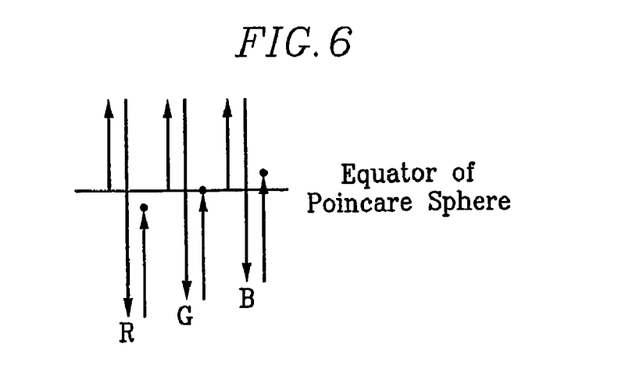
FIG. 6 illustrates polarizations of red, green and blue lights when the wavelength dispersion of a LC layer is smaller than the wavelength dispersion of compensation films.

FIG. 5 illustrates polarizations of red, green and blue lights when the wavelength dispersion of a LC layer is larger than the wavelength dispersion of compensation films, and FIG. 6 illustrates polarizations of red, green and blue lights when the wavelength dispersion of a LC layer is smaller than the wavelength dispersion of compensation films.

Referring to FIG. 5, when the wavelength dispersion of a LC layer is larger than the wavelength dispersion of the compensation films and the compensation films are optimized such that the compensation for the green light is maximized, the red light is over-compensated while the blue light under-compensated, by the compensation films such that their polarizations cannot not become perfectly linear.

On the contrary, when the wavelength dispersion of a LC layer is smaller than the wavelength dispersion of the compensation films and the compensation films are optimized such that the compensation for the green light is maximized, the red light is under-compensated and the blue light over-compensated by the compensation films such that their polarization cannot become perfectly linear as shown in FIG. 6.

Accordingly, perfect compensation is not expected to be made for all lights with different wavelengths unless the wavelength dispersion of the LC layer coincides with the wavelength dispersion of the compensation films. Although it is preferred in a typical reflective LCD that the wavelength dispersion of LC is reversed to the wavelength dispersion of the compensation films, it is preferred in an OCB mode LCD that the wavelength dispersion of LC is dose to the wavelength dispersion of the compensation films. That is, the difference of the retardation depending upon the light wavelength between the compensation films and LC is preferably minimized.

A case that the wavelength dispersion of the LC layer is smaller than the wavelength dispersion of the compensation films is described more in detail.

Figure 7:
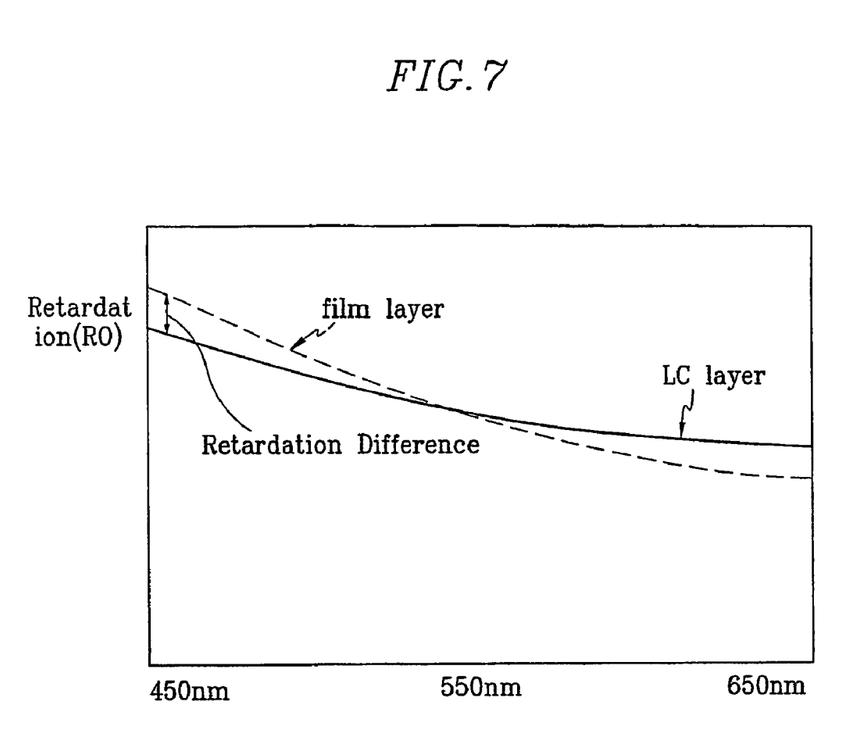
FIG. 7 is a graph showing retardation as function of light wavelength in an OCB mode LCD upon application of a voltage near a black voltage when the wavelength dispersion of a LC layer is smaller than the wavelength dispersion of compensation films.

FIG. 7 is a graph showing retardation as function of light wavelength in an OCB mode LCD upon application of a voltage near a black voltage when the wavelength dispersion of a LC layer is smaller than the wavelength dispersion of compensation films.

Since the wavelength dispersion of the compensation films and LC for red, green and blue wavelengths is different, the retardation is different for blue (i.e., short wavelength) and red (i.e., long wavelength) when the compensation is made for red, as shown in FIG. 7. For the blue light, the front retardation (d(Nx−Ny)×2) of the compensation films is larger than that of LC and thus the compensation is incomplete. On the contrary, the front retardation (d(Nx−Ny)×2) of the compensation films for the red light is smaller than that of LC and thus the compensation is incomplete.

In the meantime, the luminance for a retardation R is given as sin 2($\pi$R/$\lambda$) when the luminance for a white state is one. When the minimum contrast CR required for a display device is 150, the retardation R in a black state satisfies:

$$\sin 2(\pi R/\lambda) \leq 1/150. \quad (1)$$

From Inequality 1, $$R/\lambda \leq 0.026. \quad (2)$$

By substituting $\lambda$ in Inequality 2 with the wavelengths of red, green and blue lights, the maximum retardation R in the black state allowable for a display device is obtained, which is illustrated in the following TABLE:

|  | red | green | blue |
|---|---|---|---|
| $\lambda$ | 650 nm | 550 nm | 450 nm |
| maximum, retardation R in black state | 17 nm | 15 nm | 12 nm |

TABLE illustrate that the retardations Rr, Rg and Rb in the black state for red, green and blue wavelengths $\lambda$ satisfy Rr$\leq$17 nm, Rg$\leq$15 nm, and Rb$\leq$12 nm.

However, it is hard to make the compensation films satisfy the above-identified relations. Accordingly, the first and the second embodiments of the present invention make the cell gap have different values for respective colors to compensate the difference in the wavelength dispersion between the LC layer and the compensation films. When the wavelength dispersion of the LC layer is larger than the wavelength dispersion of the compensation films, the cell gap for short wavelength is decreased while that for long wavelength is increased since the retardation of the LC layer for the light with the short wavelength is too large while that for the light with the long wavelength is too small (in the first embodiment). On the contrary, in case that the wavelength dispersion of the LC layer is smaller than the wavelength dispersion of the compensation films, the cell gap for short wavelength is increased while that for long wavelength is decreased since the retardation of the LC layer for the light with the short wavelength is too small while that for the light with the long wavelength is too large (in the second embodiment).

The cell gap depending on the colors is obtained by several techniques, which will be described hereinafter.

Figure 8:
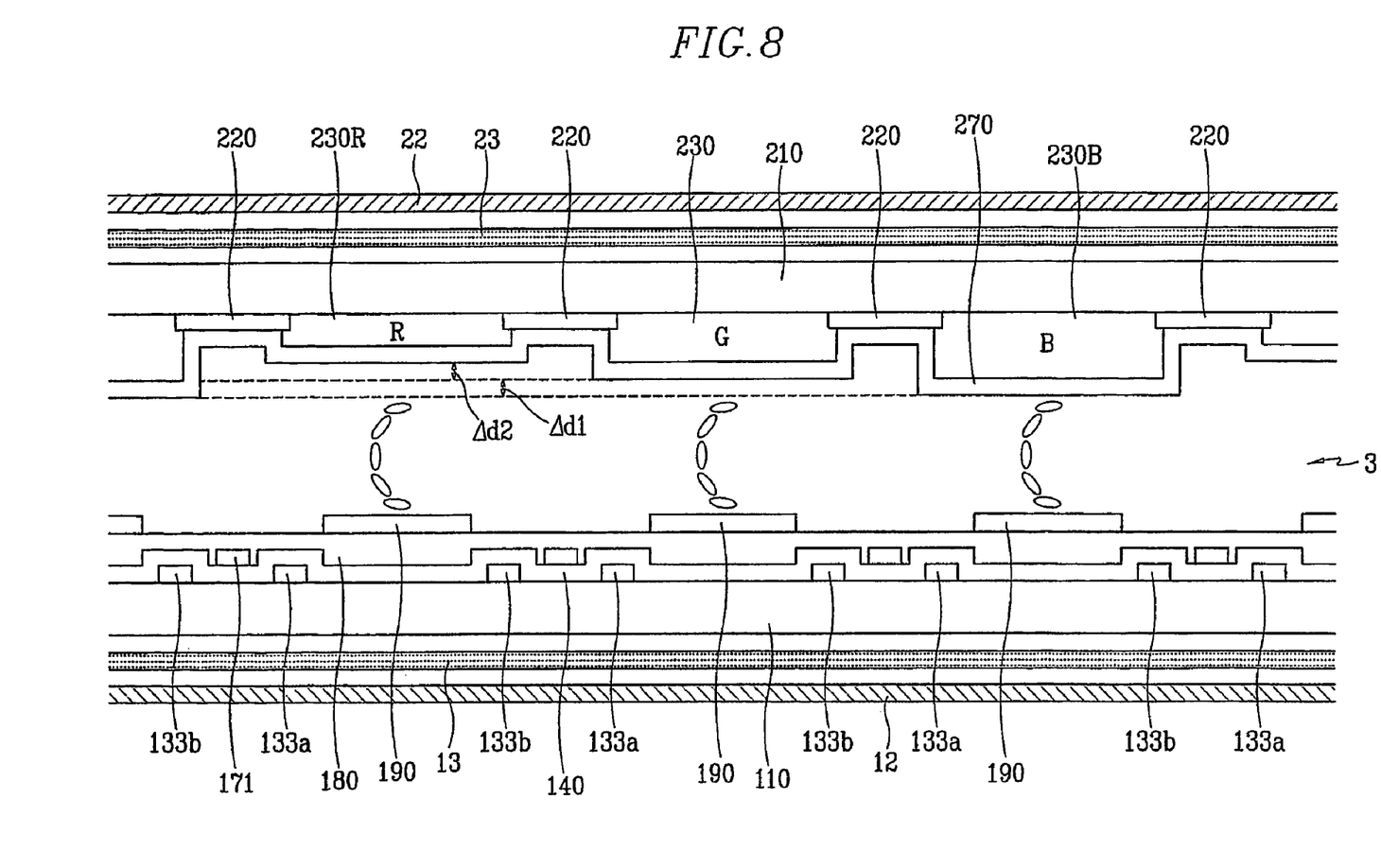
FIG. 8 is a section view of an LCD according to the third embodiment of the present invention.

FIG. 8 is a sectional view of an LCD according to a third embodiment of the present invention.

The third embodiment varies the cell gap by adjusting the thickness of color filters.

A TFT array panel of an LCD according to the third embodiment will be described.

A plurality of gate lines (not shown) extending in a transverse direction (not shown), a plurality of storage capacitor lines (not shown) extending parallel to the gate lines, and a plurality of storage electrodes 133a and 133b are formed on an insulating substrate 110 such as transparent glass. A plurality of gate electrodes knot shown) are connected to the gate lines. A gate insulating layer 140 is formed on the gate wire and the storage capacitor wire 133a and 133b and a semiconductor layer (not shown) preferably made of amorphous silicon is formed on the gate insulating layer 140. An ohmic contact layer (not shown) preferably made of amorphous silicon heavily doped with N type impurity such as phosphorous P is formed on the semiconductor layer. A plurality of source electrodes (not shown) and a plurality of drain electrodes (not shown) are formed on both portions of the ohmic contact layer, respectively, and the source electrodes are connected to a plurality of data lines 171 extending in a longitudinal direction and located on the gate insulating layer 140. A passivation layer 180 is formed on the data wire 171, and a plurality of pixel electrodes 190 connected to the drain electrodes through a plurality of contact holes are formed on the passivation layer 180. The pixel electrodes 190 are preferably made of transparent conductive material such as ITO (indium tin oxide) and IZO (indium zinc oxide).

Next, a color filter panel for an LCD according to the third embodiment of the present invention is described.

A black matrix 220 is formed on a transparent substrate 210 such as glass. The black matrix 220 is preferably made of two layers of Cr and Cr oxide and defined a plurality of pixel areas. A plurality of red, green and blue color filters 230R, 230G and 230B are formed on the pixel areas. The red, green and blue color filters 230R, 230G and 230B have different thicknesses. The red color filters 230R are the thinnest, the green color filters 230G have the next thickness, and the blue color filters 230B are the thickest, which is established for obtaining a cell gap having different values at the respective pixel areas. A common electrode 270 preferably made of transparent conductor is formed on the color filters 230R, 230G and 230B.

The LCD according to the third embodiment of the present invention is described.

The above-described TFT array panel and color filter panel are aligned to be combined, and a liquid crystal is injected between the panels to form a LC layer 3 such that liquid crystal molecules are aligned in an OCB mode. Two phase difference films, i.e., two compensation films 13 and 23 are attached to outer surfaces of the substrates 110 and 210, respectively, and two polarization films 12 and 22 are attached to outer surface of the compensation films 13 and 23 such that their polarizing axes are crossed. Thereby, the LCD according to the third embodiment is prepared. The wavelength dispersion of the LC layer 3 is larger than the wavelength dispersion of the compensation films 13 and 23. On the contrary, if the wavelength dispersion of the LC layer 3 is smaller than the wavelength dispersion of the compensation films 13 and 23, the thicknesses of the color filters are determined such that R (red)>G (green)>B (blue).

Figure 9:
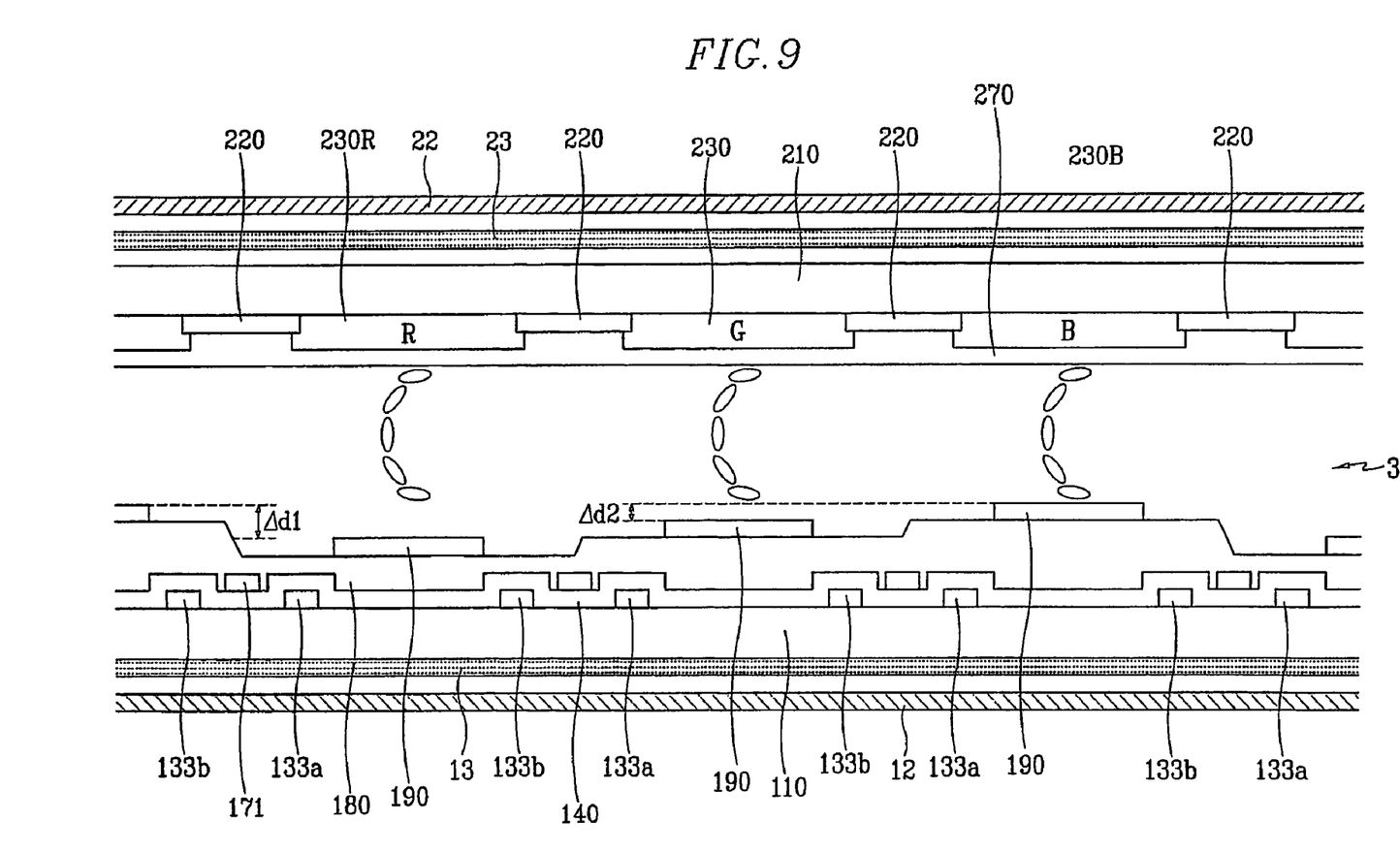
FIG. 9 is a section view of an LCD according to the fourth embodiment of the present invention.

FIG. 9 is a sectional view of an LCD according to the fourth embodiment of the present invention.

An LCD according to the fourth embodiment adjusts the thickness of a passivation layer 180 to realize the cell gap depending upon the colors. The thickness of the passivation layer 180 depends on respective color areas while the thickness of color filters maintains uniform. The other configurations of the LCD are substantially the same as that of the third embodiment Since the wavelength dispersion of the LC layer 3 is larger than the wavelength dispersion of the compensation films 13 and 23, the thickness of the passivation layer is determined such that R (red)<G (green)<B (blue). If the wavelength dispersion of the LC layer 3 is smaller than the wavelength dispersion of the compensation films 13 and 23, the thicknesses of the passivation layer is determined such that R (red)>G (green)>B (blue).

The difference in the wavelength dispersion between a LC layer and the compensation films is also compensated by differentiating black voltages for respective colors, which is described hereinafter.

Figure 10:
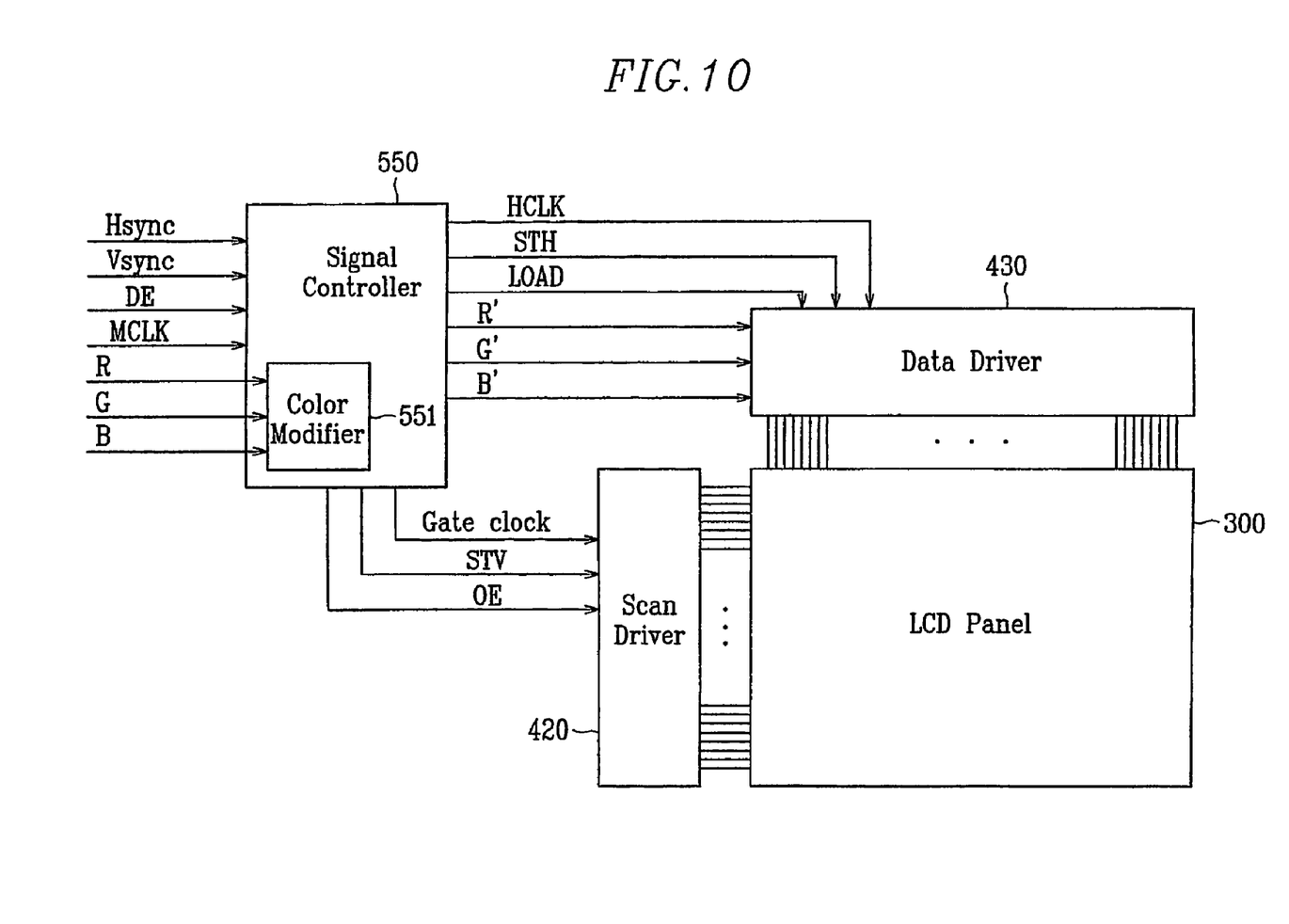
FIG. 10 is a block diagram of an LCD according to the fifth embodiment of the present invention.

FIG. 10 is a block diagram of an LCD according to a fifth embodiment of the present invention.

Referring to FIG. 10, an LCD according to a fifth embodiment of the present invention includes a signal controller 550 including a color modifier 551 therein, a data driver 430, a gate driver 420, and a LC panel 300.

The LC panel 300 includes a TFT array panel, a color filter panel, a LC layer in an OCB mode, a pair of compensation films disposed to outer surfaces of the TFT array panel and the color filter panel, a pair of polarization films disposed on outer surfaces of the compensation films, and so on. A plurality of gate lines and a plurality of data lines insulated from and intersecting each other, a plurality of TFTs and a plurality of pixel electrodes on a plurality of pixel areas defined by intersections of the gate lines and the data lines, and so on are provided on the TFT array panel. The color filter panel includes a black matrix, a plurality of red, green and blue color filters, a common electrode, etc.

The signal controller 550 including the color modifier 551 receives image signals R, G and B as well as synchronization signals Hsync and Vsync and docks DE and MCLK for displaying the image signals for an external graphic controller (not shown). The signal controller 550 performs color modification on the image signals and outputs the modified image signals to the data driver 430. Furthermore, the signal controller 550 generates digital timing signals for driving the data driver 430 and the gate driver 420 and outputs the timing signals to the drivers 420 and 430.

In detail, the signal controller 550 provides a plurality of signals for the data driver 430, such as a horizontal clock HCLK for data shift in the data driver 430, a horizontal synchronization start signal STH for instructing the data driver 430 to analog convert the data and to apply the converted analog values to the LCD panel 300, and a load signal LOAD or TP for instructing the data driver 430 to load the data signals.

In addition, the signal controller 550 provides a plurality of signals for the gate driver 420, such as a gate clock for setting periods of gate signals to be applied to the gate lines, a vertical synchronization start signal STV for instructing to start the application of the gate signals, and an output enable signal OE for enabling the output of the gate driver 420.

In the meantime, the color modifier 551 incorporated into the signal controller 550 generates modified image data corresponding to original image data from an external graphic controller (not shown) and stores the modified image data, which will be output by the signal controller 550 to the data driver 430.

When the LCD is an analog type, the LCD preferably further includes an A/D converter for converting analog original image signal from an external source into digital original image data.

Although the color modifier 551 receives the original image data from the external graphic controller (not shown) and provides the modified data for the signal controller in the above-described example according to the fifth embodiment of the present invention, the color modifier 551 may be connected to output of the signal controller.

In addition, although the above-described example according to the fifth embodiment of the present invention incorporates the color modifier into the signal controller, the color modifier may be provided external to the signal controller.

The data driver 430 receives and stores R, G and B digital data (R[0:N], G[0:N], B[0:N]) from the signal controller 550. The data driver selects data voltages corresponding to the digital data and transmits the selected data voltages to the LCD panel 300 upon the application of the load signal LOAD for instructing to apply the data voltage to the LCD panel 300.

Furthermore, the data driver 430 reverses polarities of the data voltages for pixels arranged on the LCD panel 300 every frame. The frame inversion reversing polarity of the pixels is performed for preventing the deterioration of the liquid crystal. The gate driver 420 includes a shift register, a level shifter, and a buffer.

The gate driver 420 receives the gate clock and the vertical synchronization start signal STV from the signal controller 550, and also receives a plurality of voltages such as Von, Voff and Vcom (not shown) from a gate driving voltage generator (not shown) or the signal controller 550. The gate driver 420 then outputs gate signals to the gate lines on the LCD panel 300 to turn on or off the TFTs.

The modification of the image data by the color modifier 551 is performed based on the following rule.

When the wavelength dispersion of the LC layer in the LCD panel 300 is larger than the wavelength dispersion of the compensation films, the modification satisfies a relation $V_{blue} > V_{green} > V_{red}$. It is because the retardation of the LC layer is too large for the light with short wavelength. That is, the gray voltage for the short wavelength is increased compared with that for the long wavelength such that the retardation of the LC layer for the short wavelength is reduced.

On the contrary, when the wavelength dispersion of the LC layer in the LCD panel 300 is smaller than the wavelength dispersion of the compensation films, the modification satisfies a relation $V_{blue} < V_{green} < V_{red}$. It is because the retardation of the LC layer is too small for the light with short wavelength. That is, the gray voltage for the short wavelength is decreased in comparison with that for the long wavelength such that the retardation of the LC layer for the short wavelength is increased.

The above-described modification of the image data is performed for all grays, in particular for the grays close to the black gray.

As described above, the value of the cell gap or the gray voltage is differentiated depending on the color based on the difference in the wavelength dispersion between a LC layer and compensation films such that the black luminance in an OCB mode LCD is decreased to improve the contrast ratio.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A liquid crystal display comprising:
a first insulating substrate;
a plurality of gate lines formed on the first insulating substrate;
a plurality of data lines insulated from the gate lines and intersecting the gate lines to define a plurality of pixel areas;
a plurality of pixel electrodes provided on the pixel areas;
a plurality of thin film transistors connected to the gate lines, the data lines and the pixel electrodes; a second insulating substrate facing the first insulating substrate;
a common electrode formed on the second insulating substrate;
a liquid crystal layer interposed between the first insulating substrate and the second insulating substrate and aligned in an OCB mode;
first and second compensation films provided on outer surfaces of the first and the second insulating substrate; and
first and second polarization films provided on outer surfaces of the first and the second compensation films,
wherein $Rr \leq 17$ nm, $Rg \leq 15$ nm and $Rb \leq 12$ nm where Rr, Rg and Rb are retardations of the liquid crystal layer in a black state for red, green and blue lights, respectively.

2. A liquid crystal display comprising:
a first insulating substrate;
a plurality of gate lines formed on the first insulating substrate;
a plurality of data lines insulated from the gate lines and intersecting the gate lines to define a plurality of pixel areas;
a plurality of pixel electrodes provided on the pixel areas;
a plurality of thin film transistors connected to the gate lines, the data lines and the pixel electrodes; a second insulating substrate facing the first insulating substrate;
a common electrode formed on the second insulating substrate;
a liquid crystal layer interposed between the first insulating substrate and the second insulating substrate and aligned in an OCB mode;
first and second compensation films provided on outer surfaces of the first and the second insulating substrate; and
first and second polarization films provided on outer surfaces of the first and the second compensation films,
wherein a cell gap of the liquid crystal layer has different values on the red, the green and the blue pixel areas;
red, green and blue color filters disposed between the second insulating substrate and the common electrode, arranged corresponding to the red, the green and the blue pixel areas, respectively;
a gate insulating layer insulating the gate lines and the data lines; and
a passivation layer insulating the data lines and the pixel electrodes and protecting the thin film transistors,
wherein the green color filter is thicker than the red and the blue color filters and portions of the gate insulating layer and the passivation layer on the red and the green pixel areas are removed.

3. A liquid crystal display comprising:
a first insulating substrate;
a plurality of gate lines formed on the first insulating substrate;
a plurality of data lines insulated from the gate lines and intersecting the gate lines to define a plurality of pixel areas;
a plurality of pixel electrodes provided on the pixel areas;
a plurality of thin film transistors connected to the gate lines, the data lines and the pixel electrodes; a second insulating substrate facing the first insulating substrate;
a common electrode formed on the second insulating substrate;
a liquid crystal layer interposed between the first insulating substrate and the second insulating substrate and aligned in an OCB mode;
first and second compensation films provided on outer surfaces of the first and the second insulating substrate; and
first and second polarization films provided on outer surfaces of the first and the second compensation films,
wherein a cell gap of the liquid crystal layer has different values on the red, the green and the blue pixel areas;
red, green and blue color filters disposed between the second insulating substrate and the common electrode, arranged corresponding to the red, the green and the blue pixel areas, respectively;
a gate insulating layer insulating the gate lines and the data lines; and
a passivation layer insulating the data lines and the pixel electrodes and protecting the thin film transistors,
wherein the green color filter is thicker than the red and the blue color filters and portions of the gate insulating layer and the passivation layer on the blue and the green pixel areas are removed.

* * * * *